June 2, 1953  E. SCHNEIDERMAN  2,640,619
FITTING FOR ELECTRICAL CONDUITS
Filed Jan. 5, 1950  2 Sheets-Sheet 1
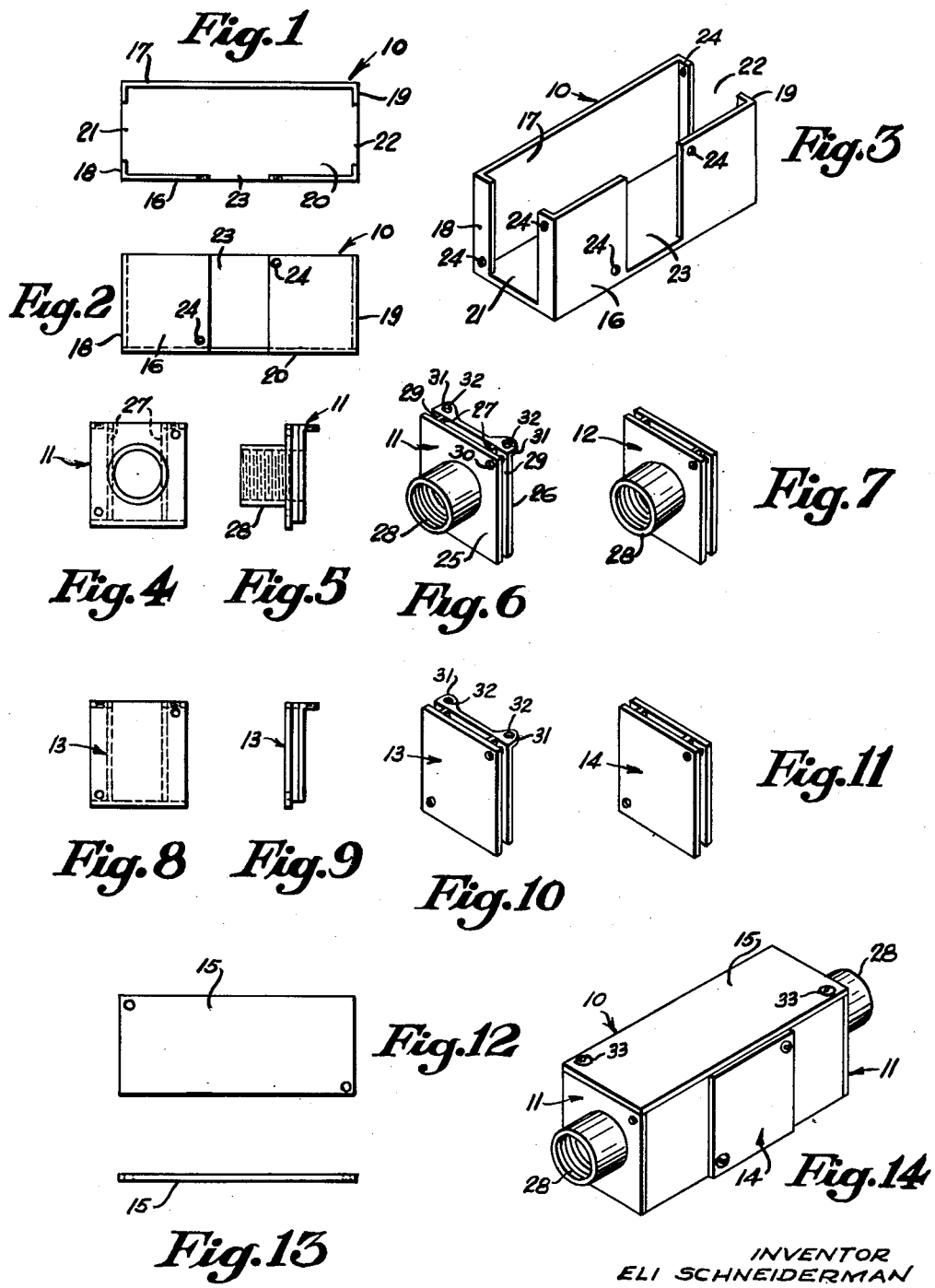
INVENTOR
ELI SCHNEIDERMAN
BY
ATTORNEYS

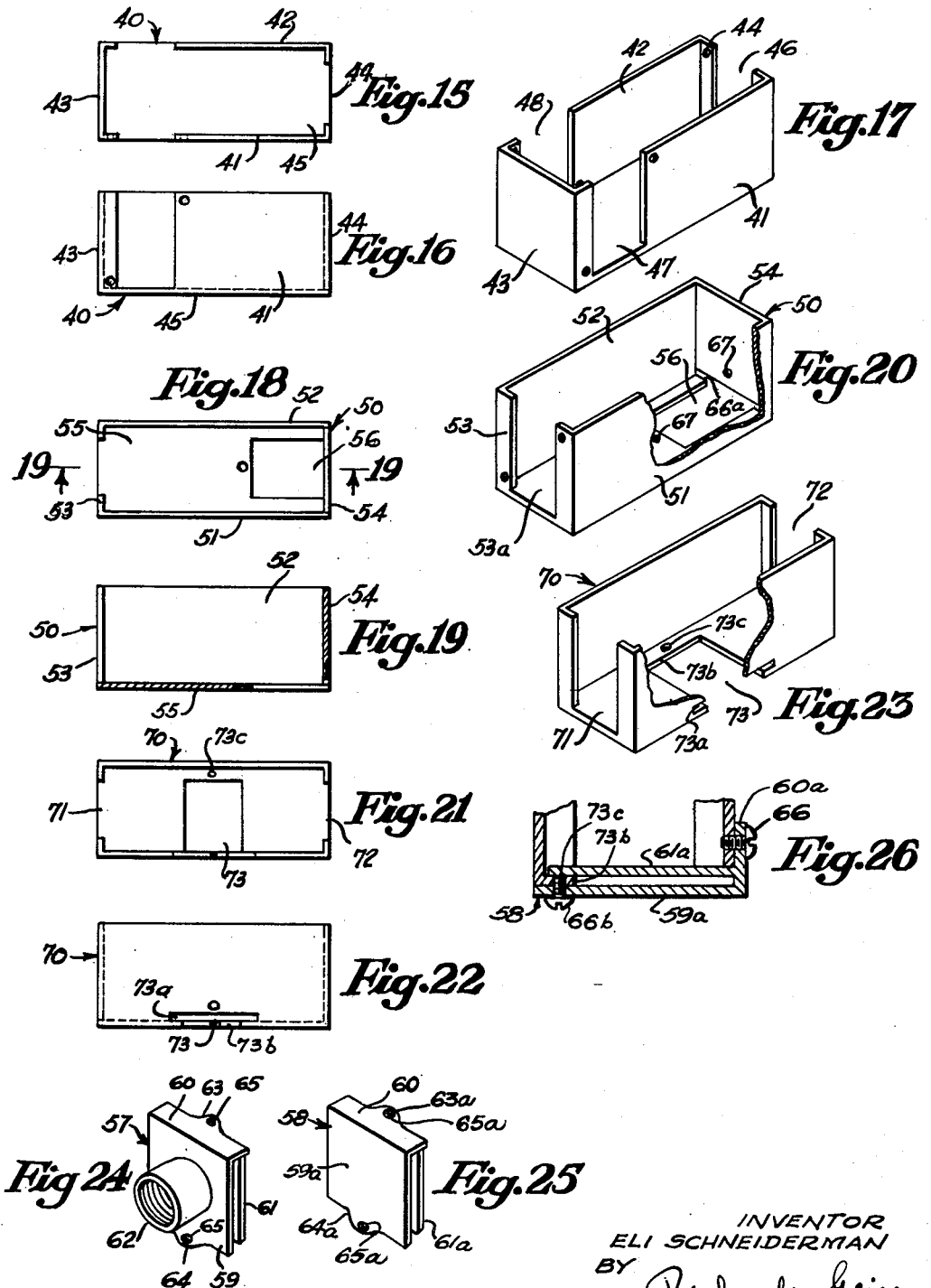

Patented June 2, 1953

2,640,619

UNITED STATES PATENT OFFICE 2,640,619

FITTING FOR ELECTRICAL CONDUITS

Eli Schneiderman, Hillside, N. J.

Application January 5, 1950, Serial No. 136,926

3 Claims. (Cl. 220—3.2)

This invention relates to improvements in the fittings for electrical conduits.

Conduits for electrical conductors in building construction require at present a number of fittings made in different angles so that the conduits may be run according to the installation, and were developed to obviate the need for bending the conduits in the required direction resulting in a substantial saving of time and labor. The fittings are used as junctions for the wires and for tapping, splicing, or pulling requirements, vary in size in accordance with the light and power load for the job, and are further divided into the following standard forms according to the National Electrical Code: "B," "C," "T," "E," "LL," "LR," "LB," "TB," and "A."

It is an object of this invention to reduce the number of fittings normally required for electrical conduit installation.

A further object is to facilitate the work of the electrical engineer and contractor.

Another object is to decrease the cost of electrical power installation.

It is also an object of the instant invention to decrease the costs of manufacturers of electrical conduit fittings.

Other objects of the instant invention will become apparent in the course of the following specification.

In the attainment of these objectives, four universal bodies of die molded metal castings are provided which by variously positioning the openings for the introduction of the conduits and equipping the openings with removable connector and blanking plates, the four single fitting bodies can be made to meet the requirements of the nine fittings normally supplied to the trade and previously mentioned.

The invention will appear more clearly from the following detailed description when taken in connection with the accompanying drawings showing by way of example a preferred form of the inventive idea.

In the drawings:

Figures 1 through 14 show one of the four universal fitting bodies provided with an opening in each end and an opening in one side at the center, and in which:

Figure 1 is a top view of the fitting;

Figure 2 is a side view of the fitting shown in Figure 1;

Figure 3 is a view in perspective of the fitting shown in Figure 1;

Figure 4 is a front view of an end connector plate with a female threaded section to take a male pipe thread;

Figure 5 is a side view of the end connector plate shown in Figure 4;

Figure 6 is a view in perspective of the end connector plate shown in Figure 4;

Figure 7 is a view in perspective of a connector plate with a female threaded portion to take a male pipe thread for the side opening shown in Figure 3;

Figure 8 is a front view of a blanking plate for the end openings of the fitting shown in Figure 3;

Figure 9 is a side view of the blanking plate shown in Figure 8;

Figure 10 is a view in perspective of the blanking plate shown in Figure 8;

Figure 11 is a view in perspective of a blanking plate for the side opening shown in Figure 1;

Figure 12 is a top view of the cover member for the fitting body shown in Figure 1;

Figure 13 is a front view of the cover member shown in Figure 12; and

Figure 14 is a view in perspective of the fitting body shown in Figure 3 assembled with two end connector plates and one side blanking plate.

Figures 15 through 17 show another form of the fitting body having only one end opening and two aligned side openings adjacent the opposite end, and in which:

Figure 16 is a front view of the fitting body shown in Figure 15; and

Figure 17 is a perspective view of the fitting body shown in Figure 15;

Figures 18 through 20 show another form of the fitting body which is provided with a bottom opening adjacent one end and inwardly directed therefrom and an end opening through the opposite end and in which:

Figure 18 is a top view of the fitting body;

Figure 19 is a longitudinal sectional view of the fitting body shown in Figure 18; and Figure 20 is a view in perspective of the fitting body shown in Figure 18 with a portion of one side broken away the more clearly to show the bottom opening.

Figures 21 through 23 show still another form of the fitting body which is characterized by being provided with openings in each end and in the bottom at the center and inwardly directed from one side, in which:

Figure 21 is a top view of the fitting body;

Figure 22 is a side view of the fitting body shown in Figure 21; and

Figure 23 is a view in perspective of the fitting body shown in Figure 21 with a portion of one side broken away the more clearly to show the bottom central opening.

Figure 24 is a view in perspective of a connector plate with a female threaded section to take a male pipe thread for the bottom openings of the fitting body.

Figure 25 is a view in perspective of a blanking plate for the bottom openings of the fitting body.

Figure 26 is a fragmentary transverse sectional view of the fitting body shown in Figure 23 assembled with the blanking plate shown in Figure 25 and on an enlarged scale.

Referring now in greater detail to the drawings designated Figures 1 through 14 where like reference numerals indicate like parts, reference numeral 10 indicates one of the four universal bodies characterized by having openings in each end and one side central opening; 11 a removable connector plate with a female threaded section to take a male pipe thread for the end openings; 12 a removable connector plate with a female threaded section for the side opening; 13 a blanking plate for the end openings; 14 a blanking plate for the side central opening; and 15 a cover member for the top of the fitting body.

The fitting body 10 may be die molded from any suitable material with the spaced parallel side members 16 and 17, the spaced parallel end members 18 and 19, and the bottom member 20 integrally formed along the corresponding edges.

The end member 18 has formed therein the rectangular opening 21 extending from the open top downwardly toward the bottom member 20 while a similar opening 22 is made in the opposite end member 19. A like rectangular opening 23 is made in the side member 16. Clearance holes 24 may be made in the body 10 adjacent the edges of the rectangular openings for the releasable attachment of the end connector plates 11 and the side connector plate 12 and the end and side blanking plates 13 and 14, respectively, described later.

The removable end connector plate 11 with a female threaded section to take a male pipe thread is constituted of an outer member 25 (Fig. 6) spaced parallel to an inner member 26 by the similar spacers 27 attached between the two members in any known manner. Through the center of the outer and inner members, 25 and 26, respectively, aligned central openings are formed and through which the female threaded section 28 extends. The inner edge of the section 28 may be flush with the inner surface of the inner member 26. It will be noted in Figure 6 that the spacers 27 are set back from the vertical edges of the outer and inner members to form similar slideways 29 for slip fitting the connector plate over the opposed edges of the openings 21 and 22. A threaded opening 30 may be made through the outer member 25 and the inner member 26 and aligned with the previously mentioned clearance holes 24 in each position thereof for the releasable attachment of the connector plate 11 to the body 10. It will be further noted that similar ears 31 are integrally formed on the inner member 26 at the top and extend rearwardly thereof in a plane perpendicular to the planes of the members. In each ear 31 there may be a tap 32 for the releasable attachment of the cover member 15 over the open top of the body 10.

The removable side connector plate 12 is the same as the previously described end connector plate 11 except that no ears are provided for the releasable attachment of the cover member 15.

The removable end blanking plate 13 is similar to the previously described end connector plate 11 except that no female threaded section 28 is provided and hence no circular openings are formed in the center of the inner and outer members.

The removable side blanking plate 14 is similar to the previously described side connector plate 12 except that no female threaded section is used.

The cover member 15 (Figs. 12 and 13) is a flat rectangular member of suitable material releasably attached over the upper edges of the opposed side members 16 and 17 and opposed end members 18 and 19 of the conduit body 10 by the screws 33 (Fig. 14) first inserted through holes in the cover member 15 aligned with the previously mentioned taps 32 of either the end connector plate 11 or blanking plate 13 as the case may be.

In operation:

At present, the trade is furnished with four separate conduit fittings to meet some of the twists and turns in a conduit line as follows: "B," "C," "T," and "E." However by using subject fitting body releasably equipped with the previously described connector and blanking plates, any one of the four known fittings may be created. For example, suppose the installer is at a point in the line where ordinarily a conduit fitting having a side central connector would be used, that is the "B" type, by placing a blanking plate 13 over each of the openings 21 and 22 in the fitting body 10 and a side connector plate 12 over the side opening 23, the installer has available the desired fitting. Again, if a conduit fitting having connectors at both ends, that is the "C" type, is required, by inserting an end connector plate 11 in each end 21 and 22 and a side blanking plate 14 in the side opening 23 the desired fitting is available. The further commonly used fittings, that is "T" and "E" are also readily obtainable. The fitting "T" is produced by having two connector sections 11 in rectangle 21 and rectangle 22, and a connector plate 12 in central section of rectangle 23. Then by placing a connector plate 11 in rectangle 22, and a blanking plate 13 in rectangle 21, and a blanking plate 14 in central section 23 the "E" fitting is produced. Thus, a substantial saving in time and material is made possible for both the manufacturer and the consumer.

In the form of fitting body shown in Figures 15 through 17, reference numeral 40 indicates the body.

The body 40 is formed with the spaced parallel side members 41 and 42, the spaced parallel end members 43 and 44, and the bottom member 45. All of the members may be integrally formed along corresponding edges by die casting.

In the end member 44 is a rectangular opening 46 extending downwardly from the top toward the bottom member 45. In the side member 41 is a similar opening 47 adjacent the opposite end member 43 and in the side member 42 an opening 48 aligned with the opening 47.

In operation, the installer frequently needs a fitting having an end connector and a connector in the side but adjacent the opposite end, commonly designed as "LL" or "LR." By attaching an end connector plate 11 over the opening 46 and a side connector plate 12 over the opening 48 with a side blanking plate 13 over the opening 47, there is created a fitting which will meet the situation where the side connector extends to the left of the end connector (Fig. 17), type "LL." However, if the side connector must extend to the right of the end connector, type "LR," then merely by placing the blanking plate 13 over the opening 48 and the side connector plate 12 over the opening 47, the problem is solved. Thus, with one fitting body and the proper arrangement of the connector and blanking plates the installer has available a single fitting that will do the work of two known fittings.

In the third form of conduit fitting shown in Figures 18 through 20, reference numeral 50 indicates the body of the fitting.

The body 50 is formed with the spaced parallel side members 51 and 52, the spaced parallel end members 53 and 54, and the bottom member 55 which may be integrally formed from die castings along corresponding edges and thus far similar to the previously described universal bodies except that the end member 54 falls short of the bottom member 55 (Fig. 20). Otherwise expressed the side members and one end member are vertically disposed along corresponding edges of the rectangular bottom member, the second end member having a height less than the height of the first mentioned end member is secured between corresponding edges of the side members. Obviously, the rectangular aperture created by the shortening of the second mentioned end member need not extend for the full width thereof. Hence, both end members may be vertically disposed on the bottom member.

In the end member 53 is the rectangular opening 53a. In the bottom member 55 is a similar rectangular opening 56 but at the opposite end of the body 50 and inwardly directed from the end.

Of course, the bottom opening 56 could be equipped with any of the previously mentioned connector and blanking plates or closures but to do so would leave an undesirable aperture in the body between the bottom of the end member 54 and the bottom member 55. Hence, a special closure or bottom connector plate 57 (Fig. 24) and a special closure or blanking plate 58 (Fig. 25) have been designed for the bottom opening 56.

The bottom closure or connector plate 57 has an outer member 59 with a right angle flange 60 along one edge to which an inner member 61 is fastened in a known manner parallel to the outer member 59. Of course, the width and depth of the inner and outer members is greater than the corresponding dimensions of the rectangular opening 56 while the flange, protruding above the inner member, is designed to cover the rectangular aperture. The inner member may be secured to the flange in a known manner with the planes of the members in spaced parallel arrangement. On the other hand, the members may be held in spaced parallel arrangement a distance greater than the thickness of the bottom member by the spacers shown in Fig. 6, the spacers being parallel to the sides of the members and spaced apart a distance less than the width of the opening. The female threaded section is passed through the members 59 and 61 in the same manner as the similar sections of the aforementioned connector plates. An ear 63 on the flange 60 and another ear 64 on the outer member 59 have openings 65 for the insertion of screws 66 (Fig. 26) in coacting taps in the body 50. By leaving a space 66a (Fig. 20) between the bottom of the end member 54 and the bottom member 55, the connector plate 57 may be slid over the opposed rims of the opening 56 with the flange 60 completely covering the end space 66a when in position. A tap 67 in the end member 54 and a similar tap in the bottom member 55 are so positioned as to be aligned with the openings 65 in the ears 63 and 64 for the releasable attachment of the closure or connector plate to the body 50.

The closure or blanking plate 58 is similar to the closure or connector plate 57 mentioned ante except that no female threaded section 62 is used. Specifically, the closure or blanking plate 58 is constituted of an outer member 59a with a right angle flange 60a along one edge to which an inner member 61a is fastened by any suitable means in spaced parallel arrangement with the outer member 59a. An ear 63a on the flange 60a and another ear 64a on the outer member 59a are provided with openings 65a for the insertion of screws, as shown in Figure 26, when attaching the closure or blanking plate to the body, one screw 66 being threaded through the flange 60a into an aligned opening in the side of the body, and the other screw 66b threaded through an opening 65a in the outer member 59a and an aligned opening 73c in the ledge 73b.

In operation, the third form of conduit fitting body by using the closure or connector plate 11 in the rectangular opening 53a and the closure or bottom connector plate 57 in the bottom opening 56 can be used for what the trade designates the "LB" fitting.

In the fourth form of the universal body shown in Figures 21 through 23, reference numeral 70 indicates the body formed in a similar manner to the previously described bodies but having rectangular end openings 71 and 72 and a bottom central opening 73 inwardly directed from one side, the side having a coacting rectangular opening or aperture 73a adjacent the bottom opening. At the back of the bottom central opening 73 is a ledge 73b provided with a tap 73c for the releasable fastening of the closures.

As in the other forms, the end closure or connector plates 11 may be releasably inserted in the end openings 71 and 72 and a closure or connector plate 57 (Fig. 24) may be placed at the bottom of the central section of rectangle 73 so as to produce a "TB" fitting. By placing two blanking plates or closures 13 in rectangles 71 and 72 and placing a closure or connector plate 57 in the bottom central section 73 (Fig. 23) the "A" fitting is produced.

It will be understood that the invention is not limited to the exact disclosure herein described but may lend itself to a variety of expressions within the scope of the appended claims.

What is claimed is:

1. A fitting for electrical conduits, the fitting comprising a hollow body, the hollow body comprising spaced parallel side members and end members, means securing said members along corresponding edges, a bottom member disposed along corresponding edges of the side and end members, and an open top; at least one of the members having a rectangular opening formed therein, a connector plate for the opening, the plate comprising an outer rectangular member, an inner rectangular member spaced parallel to the outer member and adapted to form therewith slideways for the opposed edges of the opening, and a female threaded section disposed through the plate, the center line of the female section being perpendicular to the plane of the members; the fitting further comprising a blanking plate for the rectangular opening, the blanking plate comprising an outer rectangular member, an inner rectangular member spaced parallel to the outer member and adapted to form slideways therewith for the opposed edges of the opening, and a cover member releasably disposed over the open top of the hollow body.

2. A fitting for electrical conduits, the fitting comprising a hollow body, the hollow body comprising spaced parallel side and end members, means securing said members along corresponding edges, a bottom member disposed along corresponding edges of the side and end members, each of the end members having a rectangular opening formed therein, one of the side members having a rectangular opening formed therein substantially at the center, each of the openings being open at the top; an end connector plate for at least one of the end openings, the end connector plate comprising an outer rectangular member, an inner rectangular member spaced parallel to the outer member and adapted to form therewith slideways for the opposed edges of the opening, the inner member having at least one inwardly turned ear formed thereon at the top, a female threaded section disposed through the inner and outer members, the center line of the section being perpendicular to the planes of the members; the fitting further comprising an end blanking plate for at least one of the end openings, the end blanking plate comprising an outer rectangular member, an inner rectangular member spaced parallel to the outer member and adapted to form therewith slideways for the opposed edges of the opening, the inner member having inwardly directed ears formed thereon at the top; a side connector plate for the side opening, said plate comprising an outer rectangular member, an inner rectangular member spaced parallel to the outer member and adapted to form therewith slideways for the opposed edges of the side opening, a female threaded section disposed through the plate, the center line of the section being perpendicular to the planes of the outer and inner members; a side blanking plate for the side opening, the side blanking plate comprising an outer rectangular member, an inner member spaced parallel to the outer member and adapted to form therewith slideways for the opposed edges of the side opening; and a cover member for the open top of the hollow body, and means releasably securing the cover member to the hollow body and to the ears of the end connector and blanking plates.

3. A fitting for electrical conduits, the fitting comprising a hollow body, the body comprising a rectangular bottom member and side and end members vertically disposed along corresponding edges of the bottom member, means for securing the side and end members along corresponding edges, the bottom member having formed therein a rectangular opening extending inwardly from one edge, the vertically disposed member adjacent the opening having formed therein a rectangular aperture, the aperture being extended on both sides of the opening, a closure for the rectangular opening and aperture, the closure comprising an inner member and an outer member, said members having a width and depth greater than the corresponding dimensions of the opening, the outer member having an integrally formed rectangular flange at one end, the flange being turned at a right angle to the plane of the outer member and coacting with the rectangular aperture, and means for securing the inner member to the flange in spaced parallel arrangement with the outer member.

ELI SCHNEIDERMAN.

References Cited in the file of this patent

UNITED STATES PATENTS

| Number | Name | Date |
|---|---|---|
| 933,661 | Paiste | Sept. 7, 1909 |
| 982,535 | Rudkiewicz | Jan. 24, 1911 |
| 1,032,058 | Gilson | July 9, 1912 |
| 1,402,769 | Hirshfeld | Jan. 10, 1922 |
| 2,357,755 | Moll | Sept. 5, 1944 |
| 2,401,742 | Bentham | June 11, 1946 |

FOREIGN PATENTS

| Number | Country | Date |
|---|---|---|
| 7,647 | Great Britain | 1915 |
| 258,514 | Germany | Apr. 8, 1913 |